(12) United States Patent
Bouwmans

(10) Patent No.: US 8,607,419 B2
(45) Date of Patent: Dec. 17, 2013

(54) BUCKLE FOR SECURING GOODS

(71) Applicant: Cordstrap B.V., Oostrum (NL)

(72) Inventor: Johannes H. Bouwmans, Zhejiang (CN)

(73) Assignee: Cordstrap B.V., Oostrum (NL)

( * ) Notice: Subject to any disclaimer, the term of this patent is extended or adjusted under 35 U.S.C. 154(b) by 0 days.

(21) Appl. No.: 13/922,808

(22) Filed: Jun. 20, 2013

(65) Prior Publication Data

US 2013/0276274 A1 Oct. 24, 2013

Related U.S. Application Data

(63) Continuation of application No. 12/100,014, filed on Apr. 9, 2008.

(30) Foreign Application Priority Data

Apr. 10, 2007 (NL) ...................................... 2000578

(51) Int. Cl.
*A44B 11/04* (2006.01)
*F16B 2/00* (2006.01)

(52) U.S. Cl.
USPC ............................................................ 24/200

(58) Field of Classification Search
USPC ............... 24/71.1, 163 R, 182, 197, 198, 200
See application file for complete search history.

(56) References Cited

U.S. PATENT DOCUMENTS

| | | | | |
|---|---|---|---|---|
| 1,836,923 A * | 12/1931 | Hodge | ............................. | 24/196 |
| 2,084,412 A * | 6/1937 | Schaefer | .......................... | 24/186 |
| 2,316,846 A * | 4/1943 | Diebold | ........................... | 24/200 |
| 2,977,655 A * | 4/1961 | Peters | .............................. | 24/196 |
| 3,967,347 A * | 7/1976 | Bickis, Sr. | ...................... | 24/200 |
| 4,400,855 A * | 8/1983 | Stuart | ............................... | 24/200 |
| 5,245,731 A * | 9/1993 | Funathu | .......................... | 24/200 |
| 5,577,300 A | 11/1996 | Gutrugianios | | |
| 5,644,822 A | 7/1997 | Frew | | |
| 5,933,923 A * | 8/1999 | Catlos et al. | ................ | 24/68 CD |
| 6,481,066 B1 * | 11/2002 | Ide et al. | ......................... | 24/324 |
| 6,497,012 B2 * | 12/2002 | Ide et al. | ......................... | 24/324 |
| 7,404,753 B2 * | 7/2008 | Cheng | ............................ | 450/86 |
| 7,475,453 B2 * | 1/2009 | Drake et al. | .................... | 24/324 |

FOREIGN PATENT DOCUMENTS

| | | | |
|---|---|---|---|
| CN | 1432315 | 1/2002 | |
| FR | 2809936 A3 * | 12/2001 | ............. A44B 11/06 |
| JP | 50-129330 U | 4/1974 | |
| JP | 61-111304 | 7/1986 | |
| JP | 59-079006 | 5/1987 | |
| JP | 3058108 U | 10/1989 | |
| JP | H049108 U | 5/1990 | |
| JP | 05-046304 | 6/1993 | |
| JP | 03078238 | 3/2001 | |
| JP | 2005046643 | 10/2004 | |

* cited by examiner

*Primary Examiner* — Robert J Sandy
(74) *Attorney, Agent, or Firm* — McGuireWoods LLP

(57) ABSTRACT

A buckle for securing a strap for goods, comprising a body having two side walls and bars extending between these side walls, which bar or bars provided with a peripheral roughening, wherein at least one tensioning side of the body of the bar or bars are provided with a profile which allows the strap to pass through, and that the lease strain on the strap causes the profile to bite into the strap.

42 Claims, 2 Drawing Sheets

BUCKLE FOR SECURING GOODS

CROSS-REFERENCE TO RELATED APPLICATIONS

This application is a continuation of U.S. patent application Ser. No. 12/100,014, filed Apr. 9, 2008, which is a continuation-in-part of and claims priority to, under 35 USC 119, Netherlands Application Serial No. 2000578, entitled "Buckle for Securing Goods", to Cordstrap B.V., filed on Apr. 10, 2007, all of which are hereby incorporated herein by reference in their entireties.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not applicable.

COPYRIGHTED MATERIAL

Not applicable.

BACKGROUND OF THE INVENTION

Field of the Invention (Technical Field)

The invention relates to a buckle for securing a strap for goods, comprising a body having two side walls, and bars extending between these side walls, which bars are provided with a peripheral roughening.

BRIEF SUMMARY OF THE INVENTION

Such a buckle is known from the practice of strapping in goods for the purpose of transportation.

Description of Related Art

From U.S. Pat. No. 5,933,923 a buckle is known for securing a strap for goods, having a body with two side walls and bars extending between these side walls.

From U.S. Pat. No. 3,967,347 a buckle is known for securing a strap for goods, wherein the body of the buckle comprises bars that are provided with a peripheral roughening, with the aim of improving the fastening of the strap.

The prior art buckles are not adequate, especially when transporting goods that exert a dynamic load on the strap.

The strap, usually made of PET or PP, is with the prior art buckle able to reliably secure static goods during transport; however, it is not possible to reliably secure a dynamic load, that is to say a load such as springy objects or objects on tires, which may still move to some extent during transport.

During the transport of a dynamic load the strain exerted on the strap varies which causes the strap to slip through the prior art buckle, resulting in a failing load security.

The object of the invention is to provide a solution to this problem.

BRIEF DESCRIPTION OF THE SEVERAL VIEWS OF THE DRAWINGS

The drawing shows in.

DETAILED DESCRIPTION OF THE INVENTION

Figure 1:
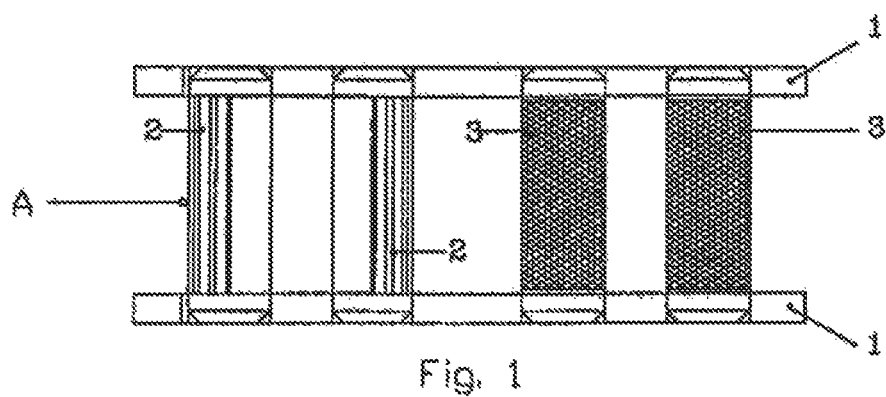
FIG. 1, a top view of the buckle according to the invention.
Figure 2:
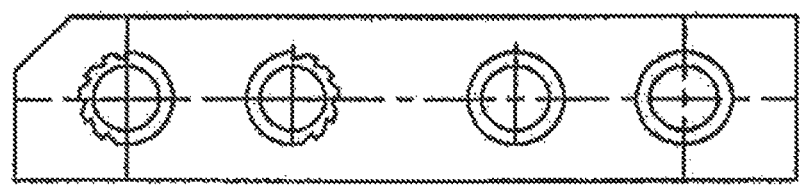
FIG. 2, a cross-sectional view of the buckle shown in FIG. 1.
Figure 3:
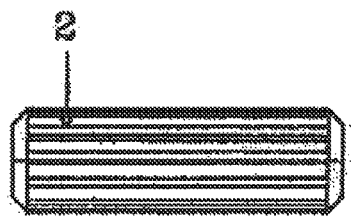
FIG. 3, a view of a first bar of the buckle according to the invention.
Figure 5:
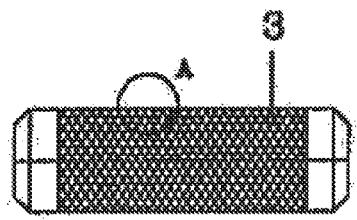
FIG. 5, a view of a second bar of the buckle according to the invention, and
FIG. 6, a detail of the surface of the bar shown in FIG. 5.
Similar components in the figures carry identical reference numerals.
Figure 4:
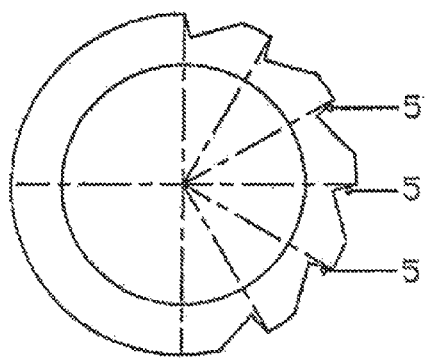
FIG. 4, a cross-sectional view of the bar shown in FIG. 3.

To this end the buckle according to the invention is characterized by one or several of the appended claims or by the embodiment of the buckle as illustrated in the appended drawings or the figure descriptions, respectively.

In a first aspect of the invention, the buckle is characterized in that at least at one tensioning side of the body the bar or bars are provided with a profile which allows the strap to pass through, and that the least strain on the strap causes the profile to bite into the strap.

It should further be noted that due to the two side walls in the body of the buckle the strap is prevented from pulling out of alignment, which may also prevent slipping.

The sought functionality and effectiveness of the buckle according to the invention is in particular facilitated by the fact that at the tensioning side of the buckle, the profile of the bar or bars comprises a serration, and in particular a serration that is oriented opposite to the strap's direction of strain.

Advantageously therefore the profile comprises a serration extending over substantially the entire length of the bar or bars.

Hereinafter the invention will be further elucidated by way of an exemplary embodiment and with reference to the drawing, while the given elucidation forms no limitation with respect to the appended patent claims.

Referring first to FIG. 1, where a buckle is shown for securing a strap for goods. The manner in which the strap is passed through the buckle is fully known to the person skilled in the art so that it is not necessary to explain this or to show in the figures how the strap is passed through the buckle. The tensioning side of the buckle is indicated at A.

The buckle shown in FIG. 1 comprises a body that possesses two side walls 1, and bars 2, 3 extending between these side walls 1, which bars are provided with a peripheral roughening.

In essence the invention is embodied in the bar or bars 2 provided at least at the tensioning side A of the body, which are provided with a profile such as to allow the strap to pass through, and in particular, such that the least strain on the strap causes the profile of these bars 2 to bite into the strap.

The figures, and especially FIGS. 3 and 5 or 4 and 6, respectively, clearly show that the bars 2, 3 are provided with a peripheral roughening. This applies to the bars 2 as well as to the bars 3. However, the roughening provided on the bars 2 at the tensioning side of the buckle possesses a characterizing feature that distinguishes the invention.

The roughening on the bars 2 is a positive roughening with respect to the one that is (or may be) provided on the bars 3, meaning that the profile comprises a serration 5 that is oriented opposite to the strap's direction of strain.

Figure 6:
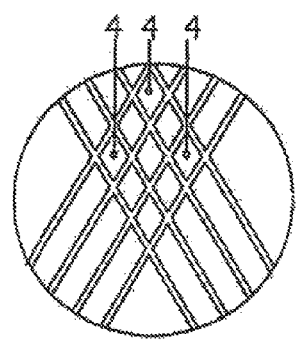

As clearly shown in FIG. 6, the profile of the bars 3 takes the form of a grid whereby the same is provided with a plurality of individual contact surfaces 4, with each contact surface during use exerting a point load on the strap.

The serration 5 provided on the bars 2 and, as explained above, extending substantially over the entire length of the bar or bars 2, achieves that the least strain on the strap causes the serration 5 to be pressed into the material of the strap, which prevents the strap from slipping back when a relief moment occurs, as is possible during the transport of a dynamic load.

At the same time, the serration 5 is of such a nature that the strap is simple to fit and easy to pass through the buckle according to the invention without, however, losing the feature of this serration 5, which engages the strap at the least strain during transport of a load.

What is claimed is:

1. A buckle for securing goods, the buckle comprising:
   a first wall;
   a second wall that is substantially parallel to the first wall; and
   a plurality of bars extending from the first wall to the second wall, wherein:
      each of the plurality of bars is substantially perpendicular to the first wall;
      each of the plurality of bars is substantially perpendicular to the second wall;
      at least one of the plurality of bars comprises a serrated portion comprising a plurality of serrations and a non-serrated portion comprising a substantially smooth surface, the serrated portion is substantially parallel to the plurality of bars and is substantially perpendicular to the first wall and to the second wall, the serrated portion being formed to engage a strap; and
      a pair of the plurality of bars form a spaced distance between the pair of bars to receive and pass therethrough the strap for securing the goods,
      wherein at least one of the plurality of serrations comprises three surface portions, where a length of a first surface portion is greater than a length of a second surface portion or a length of a third surface portion.

2. The buckle of claim 1, wherein the plurality of bars comprises four bars.

3. The buckle of claim 2, wherein another pair of the plurality of bars forms a second spaced distance, said spaced distance and said second spaced distance being substantially the same distance.

4. The buckle of claim 2, wherein a third pair of the plurality of bars forms a third spaced distance, said spaced distance is smaller than said third spaced distance.

5. The buckle of claim 1, wherein the plurality of bars comprises at least one bar that includes a grid with a plurality of individual contact surfaces that exert point loads on the strap during use.

6. The buckle of claim 2, wherein all four bars are fixed to the first wall and the second wall and incapable of movement in a longitudinal direction of the first wall or the second wall.

7. The buckle of claim 1, wherein the length of the second surface portion is greater than the length of the third surface portion.

8. The buckle of claim 1, wherein the second surface portion is substantially perpendicular to a radius of a bar of the plurality of bars.

9. The buckle of claim 1, wherein the serrated portions of the pair of the plurality of bars are substantially opposite to each other.

10. A buckle for securing goods, comprising:
    a first wall;
    a second wall that is substantially parallel to the first wall;
    a plurality of bars extending from the first wall to the second wall, wherein:
       each of the plurality of bars is substantially perpendicular to the first wall;
       each of the plurality of bars is substantially perpendicular to the second wall;
       at least one of the plurality of bars is substantially cylindrical, comprising a serrated portion and a non-serrated portion, where the serrated portion is substantially parallel to the plurality of bars and is substantially perpendicular to the first wall and to the second wall, the serrated portion being formed to engage a strap;
       a pair of the plurality of bars form a spaced distance between the pair of bars to receive and pass therethrough the strap for securing the goods; and
       a second pair of the plurality of bars that form a second spaced distance,
       wherein said spaced distance and said second spaced distance being substantially the same distance, and
       wherein said pair and said second pair of the plurality of bars are fixed to the first wall and the second wall and incapable of movement in a longitudinal direction of the first wall or the second wall.

11. The buckle of claim 10, wherein the plurality of bars comprises two bars, each of the two bars includes:
    a plurality of serrations along the serrated portion; and
    a substantially smooth surface along the non-serrated portion.

12. The buckle of claim 10, wherein the plurality of bars comprises a third pair of bars that form a third spaced distance, said spaced distance is smaller than said third spaced distance.

13. The buckle of claim 10, wherein the plurality of bars comprises at least one bar that includes a grid with a plurality of individual contact surfaces that exert point loads on the strap during use.

14. The buckle of claim 11, wherein the serrated portions of the pair of the plurality of bars are substantially opposite to each other.

15. A buckle for securing goods, comprising:
    a first wall;
    a second wall that is substantially parallel to the first wall;
    a plurality of bars extending from the first wall to the second wall, wherein:
       each of the plurality of bars is substantially perpendicular to the first wall;
       each of the plurality of bars is substantially perpendicular to the second wall;
       at least one of the plurality of bars is substantially cylindrical, comprising a serrated portion and a non-serrated portion, where the serrated portion is substantially parallel to the plurality of bars and is substantially perpendicular to the first wall and to the second wall, the serrated portion being formed to engage a strap; and
       a pair of the plurality of bars form a spaced distance between the pair of bars to receive and pass therethrough the strap for securing the goods,
       wherein the serrated portion comprises three surface portions, where a length of a first surface portion is greater than a length of a second surface portion or a length of a third surface portion.

16. The buckle of claim 15, wherein the length of the second surface portion is greater than the length of the third surface portion.

17. The buckle of claim 15, wherein the second surface portion is substantially perpendicular to a radius of a bar of the plurality of bars.

18. A buckle, comprising:
a first wall;
a second wall that is substantially parallel to the first wall; and
a plurality of bars extending from the first wall to the second wall, wherein:
 each of the plurality of bars is substantially perpendicular to the first wall and to the second wall;
 each of the plurality of bars includes a first end and a second end, wherein the first end of each of the plurality of bars connects to an inner portion of the first wall and the second end of each of the plurality of bars connects to an inner portion of the second wall;
 at least one of the plurality of bars includes a serrated portion comprising at least one longitudinal serration configured to bite into a strap, the at least one longitudinal serration being substantially perpendicular to the first wall and to the second wall and substantially parallel to a longitudinal axis of the bar; and
 at least one of the plurality of bars includes a non-serrated portion comprising a substantially smooth surface,
 wherein the plurality of bars includes four bars comprising a first bar, a second bar, a third bar, and a fourth bar,
 wherein the first bar, the second bar, the third bar, and the fourth bar are arranged to create a spaced distance between each pair of a plurality of pairs of bars, including a first spaced distance between the first bar and the second bar, a second spaced distance between the second bar and the third bar, and a third spaced distance between the third bar and the fourth bar, and
 wherein the first spaced distance and the third spaced distance are substantially equal spaced distances.

19. The buckle of claim 18, wherein the at least one longitudinal serration extends over substantially an entire length of at least one of the plurality of bars.

20. The buckle of claim 18, wherein a profile of the longitudinal serration is oriented opposite to the strap's direction of strain.

21. The buckle of claim 18, wherein each of the plurality of bars is substantially cylindrical.

22. A buckle, comprising:
a first wall;
a second wall that is substantially parallel to the first wall; and
a plurality of bars extending from the first wall to the second wall, wherein:
 each of the plurality of bars is substantially perpendicular to the first wall and to the second wall;
 each of the plurality of bars includes a first end and a second end, wherein the first end of each of the plurality of bars connects to an inner portion of the first wall and the second end of each of the plurality of bars connects to an inner portion of the second wall;
 at least one of the plurality of bars includes a serrated portion comprising at least one longitudinal serration configured to bite into a strap, the at least one longitudinal serration being substantially perpendicular to the first wall and to the second wall and substantially parallel to a longitudinal axis of the bar; and
 at least one of the plurality of bars includes a non-serrated portion comprising a substantially smooth surface,
 wherein the plurality of bars includes four bars comprising a first bar, a second bar, a third bar, and a fourth bar,
 wherein the first bar, the second bar, the third bar, and the fourth bar are arranged to create a spaced distance between each pair of a plurality of pairs of bars, including a first spaced distance between the first bar and the second bar, a second spaced distance between the second bar and the third bar, and a third spaced distance between the third bar and the fourth bar, and
 wherein the second spaced distance is larger than the third spaced distance or the first spaced distance.

23. A buckle, comprising:
a first wall and a second wall, wherein the first wall is substantially parallel to the second wall; and,
a plurality of parallel bars extending from the first wall to the second wall, wherein each of the plurality of parallel bars is substantially perpendicular to the first wall and to the second wall, wherein the plurality of parallel bars further includes:
 a first bar that includes one or more serrations that are substantially parallel to the first bar and that are substantially perpendicular to the first wall and the second wall, wherein at least one of the one or more serrations are provided on a side of the first bar that engages a strap; and,
 a second bar that includes one or more serrations that are substantially parallel to the second bar and that are substantially perpendicular to the first wall and the second wall, wherein at least one of the one or more serrations are provided on a side of the second bar that is opposite said side of the first bar and that engages the strap;
 wherein the first bar and the second bar are arranged in a manner that creates a first fixed spaced distance between the first bar and the second bar,
 wherein at least one of the one or more serrations is directionally shaped so that the strap sliding over the serration can more easily slide in one direction than the opposite direction, and
 wherein at least one directionally shaped serration of the first bar is oriented in a direction that is opposite of at least one directionally shaped serration of the second bar.

24. The buckle of claim 23, wherein the first and second bars each have two directionally-shaped longitudinal ridge serrations, wherein the two directionally-shaped longitudinal ridge serrations on the first bar are oriented in a direction opposite from the direction of the two directionally-shaped longitudinal ridge serrations on the second bar.

25. The buckle of claim 23, wherein the first and second bars each have three directionally-shaped longitudinal ridge serrations, wherein the three directionally-shaped longitudinal ridge serrations on the first bar are oriented in a direction opposite from the direction of the three directionally-shaped longitudinal ridge serrations on the second bar.

26. The buckle of claim 23, wherein the first and second bars each have four directionally-shaped longitudinal ridge serrations, wherein the four directionally-shaped longitudinal ridge serrations on the first bar are oriented in a direction opposite from the direction of the four directionally-shaped longitudinal ridge serrations on the second bar.

27. The buckle of claim 23, wherein the first and second bars each have five directionally-shaped longitudinal ridge serrations, wherein the five directionally-shaped longitudinal ridge serrations on the first bar are oriented in a direction opposite from the direction of the five directionally-shaped longitudinal ridge serrations on the second bar.

28. The buckle of claim 23, wherein the plurality of bars comprises at least one bar that includes a grid with a plurality of individual contact surfaces that exert point loads on the strap during use.

29. The buckle of claim 23, wherein:
the at least one directionally shaped serration is configured to engage the strap;
the at least one directionally-shaped serration is further configured to engage the strap in a manner that creates resistance when a force is applied to the strap in an attempt to move the strap in a first direction; and
the at least one directionally-shaped serration is further configured to permit the strap to move with less resistance when a force is applied to the strap in an attempt to move the strap in a second direction that is substantially opposite to the first direction.

30. The buckle of claim 23, wherein each of the plurality of parallel bars includes a first end and a second end, wherein the first end of each of the plurality of bars connects to an inner portion of the first wall and the second end of each of the plurality of bars connects to an inner portion of the second wall.

31. The buckle of claim 23, wherein the plurality of parallel bars includes a third bar and a fourth bar.

32. The buckle of claim 31, wherein the third bar and the fourth bar are arranged in a manner that creates a second fixed spaced distance between the third bar and the fourth bar and a third fixed space between the second bar and the third bar.

33. The buckle of claim 32, wherein
the first spaced distance and the second spaced distance are substantially equal spaced distances; and,
the third spaced distance is larger than the first spaced distance.

34. A buckle, comprising:
a first wall and a second wall, wherein the first wall is substantially parallel to the second wall; and,
a plurality of parallel bars extending from the first wall to the second wall, wherein each of the plurality of parallel bars is substantially perpendicular to the first wall and to the second wall, wherein the plurality of parallel bars further includes:
a first bar that includes one or more serrations that are substantially parallel to the first bar and that are substantially perpendicular to the first wall and the second wall, wherein at least one of the one or more serrations are provided on a side of the first bar that engages a strap; and,
a second bar that includes one or more serrations that are substantially parallel to the second bar and that are substantially perpendicular to the first wall and the second wall, wherein at least one of the one or more serrations are provided on a side of the second bar that is opposite said side of the first bar and that engages the strap,
wherein the first bar and the second bar are arranged in a manner that creates a first fixed spaced distance between the first bar and the second bar,
wherein at least one of the one or more serrations is directionally shaped so that the strap sliding over the serration can more easily slide in one direction than the opposite direction, and
wherein the one or more directionally shaped serrations of the first bar are oriented in a counter-clockwise direction and the one or more directionally shaped serrations of the second bar are oriented in a clockwise direction.

35. A buckle, comprising:
a first wall and a second wall, wherein the first wall is substantially parallel to the second wall; and,
a plurality of parallel bars extending from the first wall to the second wall, wherein each of the plurality of parallel bars is substantially perpendicular to the first wall and to the second wall, wherein the plurality of parallel bars further includes:
a first bar that includes one or more serrations that are substantially parallel to the first bar and that are substantially perpendicular to the first wall and the second wall, wherein at least one of the one or more serrations are provided on a side of the first bar that engages a strap; and,
a second bar that includes one or more serrations that are substantially parallel to the second bar and that are substantially perpendicular to the first wall and the second wall, wherein at least one of the one or more serrations are provided on a side of the second bar that is opposite said side of the first bar and that engages the strap,
wherein the first bar and the second bar are arranged in a manner that creates a first fixed spaced distance between the first bar and the second bar,
wherein at least one of the one or more serrations is directionally shaped so that the strap sliding over the serration can more easily slide in one direction than the opposite direction, and
wherein the one or more directionally shaped serrations of the first bar include a directionally-shaped longitudinal ridge that spans substantially the entire length of the first bar.

36. The buckle of claim 35, wherein the directionally-shaped longitudinal ridge of the first bar includes a steeper side and a shallower side.

37. The buckle of claim 36, wherein the steeper side of the directionally-shaped longitudinal ridge serrations are inclined at an angle of about 15 degrees from the bar radius.

38. The buckle of claim 36, wherein the shallower side of the directionally-shaped longitudinal ridge serrations are inclined at an angle of about 55 degrees from the bar radius.

39. The buckle of claim 36, wherein the steeper side of the directionally-shaped longitudinal ridge serrations are inclined at an angle of about 15 degrees from the bar radius and the shallower side of the directionally-shaped longitudinal ridge serrations are inclined at an angle of about 55 degrees from the bar radius.

40. A buckle, comprising:
a first wall and a second wall, wherein the first wall is substantially parallel to the second wall; and,
a plurality of parallel bars extending from the first wall to the second wall, wherein each of the plurality of parallel bars is substantially perpendicular to the first wall and to the second wall, wherein the plurality of parallel bars further includes:
a first bar that includes one or more serrations that are substantially parallel to the first bar and that are substantially perpendicular to the first wall and the second wall, wherein at least one of the one or more serrations are provided on a side of the first bar that engages a strap; and,
a second bar that includes one or more serrations that are substantially parallel to the second bar and that are substantially perpendicular to the first wall and the second wall, wherein at least one of the one or more serrations are provided on a side of the second bar that is opposite said side of the first bar and that engages the strap, wherein the first bar and the second bar are arranged in a manner that creates a first fixed spaced distance between the first bar and the second bar, wherein at least one of the one or more serrations is directionally shaped so that the strap sliding over the serration can more easily slide in one direction than the opposite direction, and wherein the one or more directionally shaped serrations of the second bar include a directionally-shaped longitudinal ridge that spans substantially the entire length of the second bar.

41. A buckle, comprising:

a first wall and a second wall, wherein the first wall is substantially parallel to the second wall; and, a plurality of parallel bars extending from the first wall to the second wall, wherein each of the plurality of parallel bars is substantially perpendicular to the first wall and to the second wall, wherein the plurality of parallel bars further includes:

a first bar that includes one or more serrations that are substantially parallel to the first bar and that are substantially perpendicular to the first wall and the second wall, wherein at least one of the one or more serrations are provided on a side of the first bar that engages a strap; and, a second bar that includes one or more serrations that are substantially parallel to the second bar and that are substantially perpendicular to the first wall and the second wall, wherein at least one of the one or more serrations are provided on a side of the second bar that is opposite said side of the first bar and that engages the strap, wherein the first bar and the second bar are arranged in a manner that creates a first fixed spaced distance between the first bar and the second bar, wherein at least one of the one or more serrations is directionally shaped so that the strap sliding over the serration can more easily slide in one direction than the opposite direction, and wherein the one or more directionally shaped serrations of the first bar include a directionally-shaped longitudinal ridge that spans substantially the entire length of the first bar, and wherein the one or more directionally shaped serrations of the second bar include a directionally-shaped longitudinal ridge that spans substantially the entire length of the second bar.

42. A buckle, comprising:

a first wall and a second wall, wherein the first wall is substantially parallel to the second wall; and, a plurality of parallel bars extending from the first wall to the second wall, wherein each of the plurality of parallel bars is substantially perpendicular to the first wall and to the second wall, wherein the plurality of parallel bars further includes:

a first bar that includes one or more serrations that are substantially parallel to the first bar and that are substantially perpendicular to the first wall and the second wall, wherein at least one of the one or more serrations are provided on a side of the first bar that engages a strap; and, a second bar that includes one or more serrations that are substantially parallel to the second bar and that are substantially perpendicular to the first wall and the second wall, wherein at least one of the one or more serrations are provided on a side of the second bar that is opposite said side of the first bar and that engages the strap, wherein the first bar and the second bar are arranged in a manner that creates a first fixed spaced distance between the first bar and the second bar, and wherein about half of the surface area of the first bar and the second bar does not include serrations.

* * * * *